United States Patent
Sanden et al.

(10) Patent No.: US 11,015,994 B2
(45) Date of Patent: May 25, 2021

(54) DIFFERENTIAL MEMS PRESSURE SENSORS WITH A CERAMIC HEADER BODY AND METHODS OF MAKING DIFFERENTIAL MEMS PRESSURE SENSORS

(71) Applicant: Rosemount Aerospace Inc., Burnsville, MN (US)

(72) Inventors: Christopher Sanden, Bloomington, MN (US); James Joseph Mctighe, Burnsville, MN (US); Cuong Tho Huynh, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 268 days.

(21) Appl. No.: 16/109,425

(22) Filed: Aug. 22, 2018

(65) Prior Publication Data

US 2020/0064216 A1 Feb. 27, 2020

(51) Int. Cl.
*G01L 13/02* (2006.01)
*G01L 19/00* (2006.01)
*G01L 19/06* (2006.01)

(52) U.S. Cl.
CPC ........ *G01L 13/026* (2013.01); *G01L 19/0084* (2013.01); *G01L 19/0645* (2013.01)

(58) Field of Classification Search
None
See application file for complete search history.

(56) References Cited

U.S. PATENT DOCUMENTS 6,997,059 B2 * 2/2006 Ernsberger ............ G01L 9/0052
  361/283.1
7,188,530 B2   3/2007 Pedersen et al.
7,318,351 B2 * 1/2008 Cobianu ............... G01L 1/2262
  73/715

(Continued)

FOREIGN PATENT DOCUMENTS

CN         103674405 A     3/2014

OTHER PUBLICATIONS

Extended European Search Report dated Jan. 21, 2020, issued during the prosecution of European Patent Application No. EP 19193204.5.

(Continued)

*Primary Examiner* — Peter J Macchiarolo
*Assistant Examiner* — Jermaine L Jenkins
(74) *Attorney, Agent, or Firm* — Locke Lord LLP; Joshua L. Jones; Scott D. Wofsy

(57) ABSTRACT

A pressure sensor includes a MEMS pressure transducer with a pressure sensing diaphragm and sensor elements, an isolator diaphragm spaced apart from the pressure sensing diaphragm, and a ceramic header body. The ceramic header body has an electrical conductor and transducer aperture with the MEMS pressure transducer supported therein. The isolator diaphragm is coupled to the to the MEMS pressure transducer by a fluid and is sealably fixed to the ceramic body. The ceramic header body bounds the fluid and the electrical conductor electrically connects the MEMS pressure transducer with the external environment. Differential pressure sensors and methods of making pressure sensors are also described.

20 Claims, 5 Drawing Sheets

(56) References Cited

U.S. PATENT DOCUMENTS

| | | | |
|---|---|---|---|
| 7,475,597 B2* | 1/2009 | Brida | G01L 19/146 |
| | | | 73/715 |
| 8,234,926 B2 | 8/2012 | Wohlgemuth et al. | |
| 8,627,566 B2* | 1/2014 | Forgey | H01L 23/15 |
| | | | 29/888.3 |
| 8,707,774 B2 | 4/2014 | Krommenhoek et al. | |
| 9,261,425 B2* | 2/2016 | Fahimi | G01L 19/0084 |
| 9,593,995 B2* | 3/2017 | Wagner | G01L 19/0069 |
| 9,648,745 B2 | 5/2017 | Brown et al. | |
| 10,126,193 B2* | 11/2018 | Sanden | G01L 13/06 |
| 2014/0013853 A1 | 1/2014 | Wohlgemuth | |
| 2016/0377496 A1 | 12/2016 | Chiou et al. | |
| 2017/0089796 A1 | 3/2017 | Ihle et al. | |
| 2017/0205303 A1 | 7/2017 | Sanden et al. | |
| 2018/0087986 A1 | 3/2018 | Hugel et al. | |

OTHER PUBLICATIONS

Office Action from the European Patent Office for European Patent Application No. EP19193204.5, dated Jan. 11, 2021.

* cited by examiner

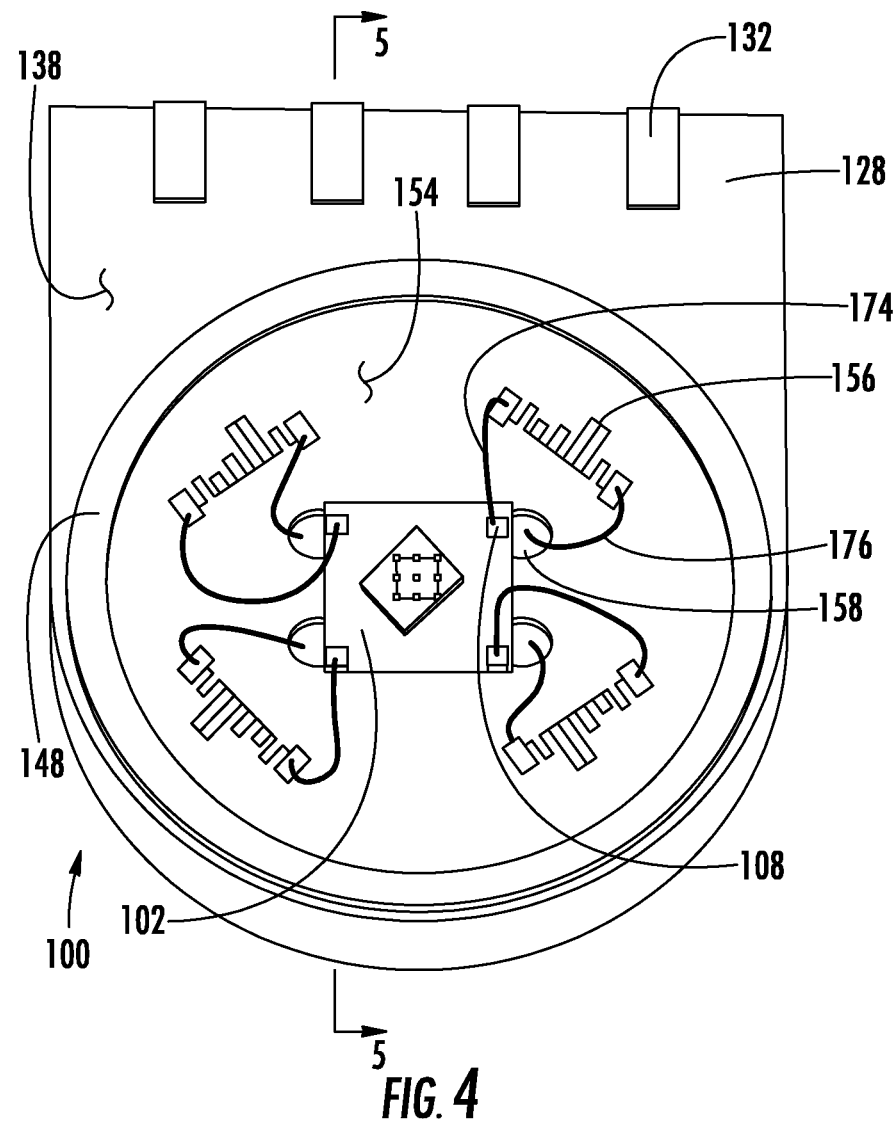
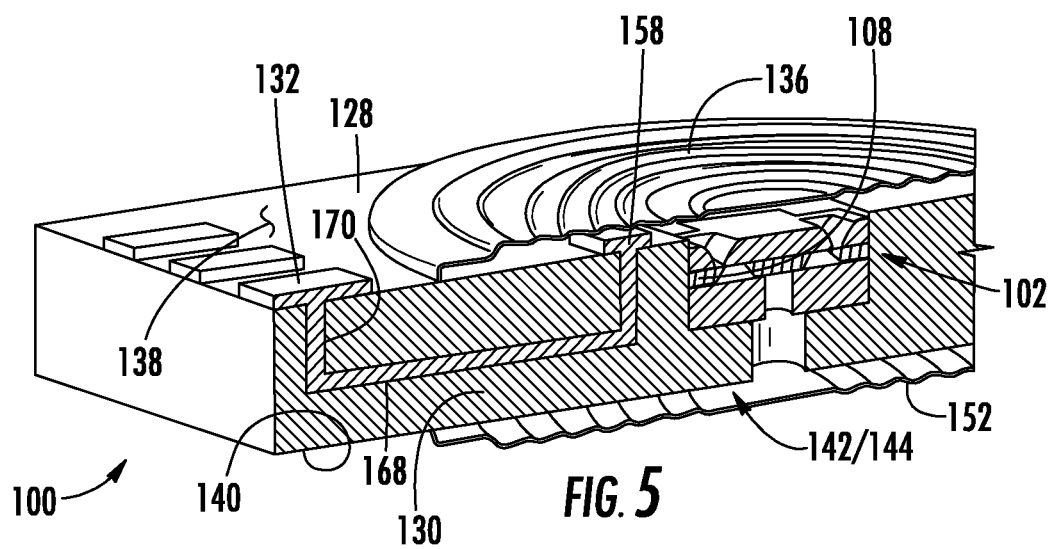

DIFFERENTIAL MEMS PRESSURE SENSORS WITH A CERAMIC HEADER BODY AND METHODS OF MAKING DIFFERENTIAL MEMS PRESSURE SENSORS

BACKGROUND OF THE INVENTION

1. Field of the Invention

The present disclosure relates to pressure sensors, and more particularly to pressure sensors having MEMS pressure transducers arranged within ceramic headers.

2. Description of Related Art

Pressure transmitters, such as those used in industrial settings to measure and monitor pressures of industrial process fluids, typically include a pressure transmitter. The pressure transmitter itself is typically unsuited for direct measurement of the process fluid and is therefore generally located within the interior of steel housing containing a sense media, like pressure transfer oil, which communicates pressure change in the external environment to the pressure transmitter. The pressure transmitter generates an electrical signal based on the pressure communicated by the sense media, which is indicative pressure in the external environment.

Transmission of the electrical signal is typically accomplished by sensor leads. The sensor leads run from the pressure transmitter to through the housing wall external circuitry. Since the housing interior is typically sealed from the external environment a pass-through structure is generally used. The pass-through typically includes a ceramic or glass structure seating the lead or lead conduit in an aperture and thereby preventing leakage of the sense media from the housing interior. Such pass-through structures adds cost and require care during assembly and use to avoid leakage of the sensor fluid from the housing interior.

Such conventional steel housing have generally been considered satisfactory for their intended purpose. However, there is still a need in the art for improved pressure sensors and methods of making pressure sensors, e.g., that are less costly and/or less susceptible to leakage or damage during assembly. The present disclosure provides a solution for this need.

SUMMARY OF THE INVENTION

A pressure sensor includes a microelectromechanical system (MEMS) pressure transducer with a pressure sensing diaphragm and sensor elements, an isolator diaphragm spaced apart from the pressure sensing diaphragm, and a ceramic header body. The ceramic header body has an electrical conductor and transducer aperture with the MEMS pressure transducer supported therein. The isolator diaphragm is coupled to the to the MEMS pressure transducer by a fluid and is sealably fixed to the ceramic body. The ceramic header body bounds the fluid and the electrical conductor electrically connects the MEMS pressure transducer with the external environment.

In certain embodiments the electrical conductor can include a trace. The trace can be located within an interior of the ceramic header body. The trace can be buried within the interior or ceramic header body. The trace can be electrically connected to the MEMS pressure transducer. The electrical conductor can include a via. The via can be located within the interior of the ceramic header body. The via can be electrically connected to the MEMS pressure transducer. The electrical conductor can include an interior contact pad. The interior contact pad can be arranged within the transducer aperture. The interior contact pad can be electrically connected to the MEMS pressure transducer. The ceramic header body can include no penetrations for electrical leads.

In accordance with certain embodiments the electrical conductor can include an exterior contact pad. The exterior contact pad can be arranged on the exterior of the ceramic header body. The exterior contact pad can be electrically connected to the MEMS pressure transducer. The electrical conductor can include a trim resistor. The trim resistor can be spaced apart from the isolation diaphragm. The trim resistor can be electrically connected to the MEMS pressure transducer. A first wire bond can connect the interior contact pad to the trim resistor. A second wire bond can connect the trim resistor to the MEMS pressure transducer.

It is contemplated that the transducer aperture can be divided into a first chamber and a second chamber. The header body can include a metallization ring. The metallization ring can extend about the transducer aperture. The isolation diaphragm can be fixed to the metallization ring. The isolation diaphragm can be a first isolation diaphragm and the pressure sensor can include a second isolation diaphragm. The second isolation diaphragm can be seated on the ceramic header body on a side of the MEMS pressure transducer opposite the first isolator diaphragm.

It is also contemplated that, in accordance with certain embodiments, the ceramic header body can include a pedestal shelf. The pedestal shelf can bound the transducer aperture. A pedestal can be seated on the pedestal shelf to support the MEMS pressure transducer and bound the fluid. The transducer aperture defined by the ceramic header body can have a fluid displacement structure. The fluid displacement structure can limit fluid volume within the transducer aperture for linearizing response of the MEMS pressure transducer. The fluid can include a low coefficient of thermal expansion fluid.

A differential pressure sensor includes a pressure sensor as described above with a second isolator diaphragm. The second isolator diaphragm is seated on a side of the MEMS pressure transducer opposite the first isolator diaphragm. The electrical conductor includes an exterior contact pad on the header exterior, a via electrically connected to the exterior contact pad, a trace electrically connected to the via, an interior contact pad arranged within the transducer aperture, and a trim resistor electrically connected to the interior contact pad and spaced apart from the first isolator diaphragm. A first wire bond connects the interior contact pad to the trim resistor and a second wire bond connects the trim resistor to the MEMS pressure transducer. A low coefficient of thermal expansion fluid is disposed in the transducer aperture.

A method of making a pressure sensor includes depositing a first ceramic layer using an additive manufacturing technique. A second ceramic layer is deposited on the first ceramic layer using the additive manufacturing technique such the first and second ceramic layers define a transducer aperture. Depositing at least one of the first ceramic layer and the second ceramic layer includes depositing an electrical conductor with the at least one of the first ceramic layer and the second ceramic layer. A MEMS pressure transducer having a pressure sensing diaphragm with sensor elements in the transducer aperture is supported within the transducer aperture. An isolator diaphragm is spaced apart from the pressure sensing diaphragm and is coupled to the isolator diaphragm with the pressure sensing diaphragm with a fluid.

In certain embodiments depositing the second ceramic layer can include defining a trace within the second ceramic layer and electrically connecting the MEMS pressure transducer to the trace. Depositing the second ceramic layer can include defining a via within the second ceramic layer and electrically connecting the MEMS pressure transducer to the via. A chamber contact pad can be defined within the transducer aperture. An external contact pad can be defined on the second ceramic layer. A trim resistor can be defined on the second ceramic layer and the external contact pad connected to the chamber contact pad through the trim resistor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 4 is a plan view of the pressure sensor of FIG. 1 with the isolation diaphragm removed, showing trim resistors arranged within a metallization ring and connected to the MEMS pressure transducer and interior contact pad by wire bonds;

FIG. 5 is cross-sectional view of the pressure sensor of FIG. 1, showing an electrical conductor including a trace and a via arranged within the interior of the ceramic header body connecting the interior and exterior contacts.

DETAILED DESCRIPTION OF THE PREFERRED EMBODIMENTS

Figure 1:
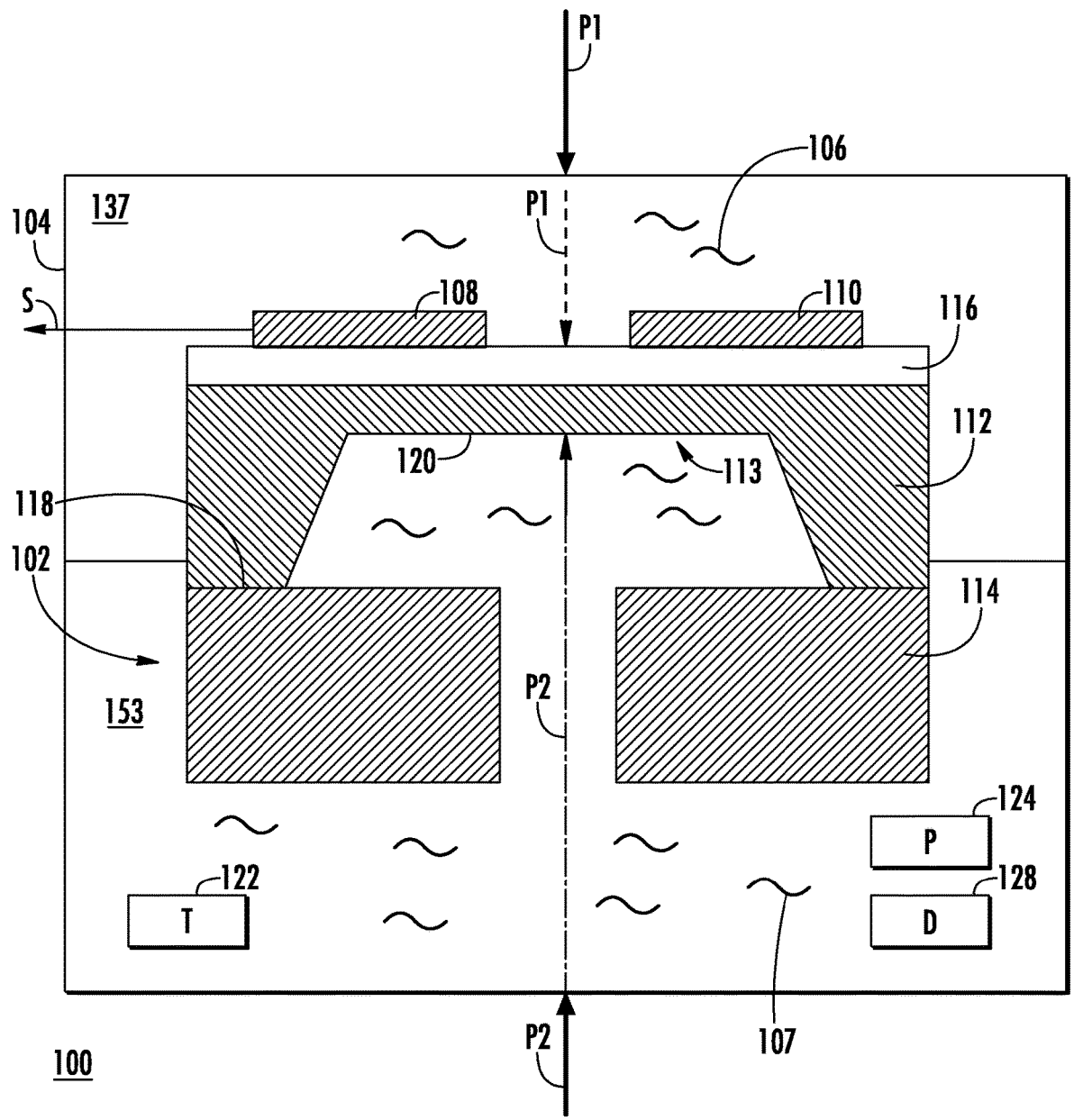
FIG. 1 is a cross-sectional view of an exemplary embodiment of a pressure constructed in accordance with the present disclosure, schematically showing a microelectromechanical system (MEMS) pressure sensor supported in a header formed from a ceramic header body.

Reference will now be made to the drawings wherein like reference numerals identify similar structural features or aspects of the subject disclosure. For purposes of explanation and illustration, and not limitation, a partial view of an exemplary embodiment of pressure sensor in accordance with the disclosure is shown in FIG. 1 and is designated generally by reference character 100. Other embodiments of pressure sensors, differential pressure sensors, and methods of making pressure sensors in accordance with the disclosure, or aspects thereof, are provided in FIGS. 2-6, as will be described. The systems and methods described herein can be used sensing differential pressure, such as in gas turbine engines, though the present disclosure is not limited to gas turbine engines or to differential pressure sensing in general.

Referring to FIG. 1, pressure sensor 100 is shown. Pressure sensor 100 includes a microelectromechanical system (MEMS) pressure transducer 102 disposed within a ceramic header body 104. Ceramic header body 104 is configured and adapted for communicating a first pressure P1 and a second pressure P2 to MEMS pressure transducer 102 through ceramic header body 104 via a fluid 106/107 contained within ceramic header body 104, e.g., as a differential pressure sensor. First pressure P1 acts on a first isolation diaphragm 136 and is conveyed to MEMS pressure transducer 102 via fluid 106/107 located in a first chamber 137 of pressure sensor 100. Second pressure P2 acts on a second isolation diaphragm 152 and is conveyed to MEMS pressure transducer 102 via fluid 106/107 located in a second chamber 153 of pressure sensor 100. Fluid 106/107 includes a low coefficient of thermal expansion (CTE) fluid. The operation of such pressure sensors is understood by those of skill in the art will not be described further within the present disclosure.

MEMS pressure transducer 102 includes four resistors configured as a Wheatstone bridge (indicated with a first sensing element 108 and a second sensing element 110 in FIG. 1), a wafer 112, a backing wafer 114, and a dielectric coating 116. Wafer 112 is connected to backing wafer 114 at a bond line 118. Wafer 112 has a backing surface 120 exposed to fluid 106/107 and deformable according differential between first pressure P1 and second pressure P2 which forms a pressure sensing diaphragm 132. Dielectric coating 116 is deposited over a surface of wafer 112 opposite backing surface 120. First sensing element 108 and second sensing element 110 are arranged on dielectric coating 116 and responsive to deformation of wafer 112 to generate a signal S indicative of differential between first pressure P1 and second pressure P2.

Figure 2:
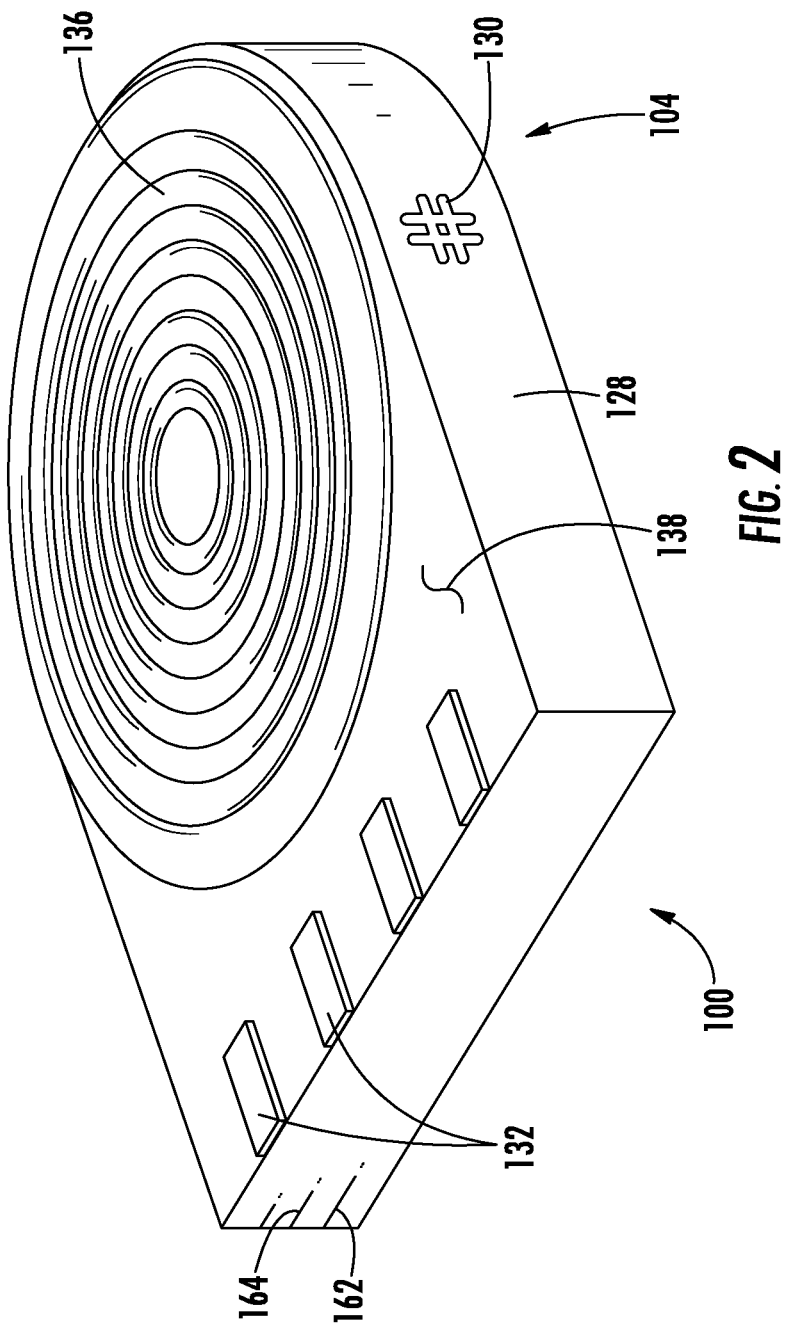
FIG. 2 is a perspective view of the pressure sensor of FIG. 1, showing the ceramic header body with an isolator diaphragm sealably fixed to the ceramic header body and an exterior contact pad located outside of the isolator diaphragm.

With reference to FIG. 2, pressure sensor 100 is shown according to an exemplary embodiment. Ceramic header body 104, which can have dimensioning 128 corresponding to that of a pressure sensor with a metallic housing with pass-through, includes a ceramic material 130. Ceramic material 130 is an electrical insulator and surrounds an electrical conductor 168/170 (shown in FIG. 5) which is embedded within ceramic header body 104 for communicating electrically with MEMS pressure transducer 102 (shown in FIG. 1), as will be described. MEMS pressure transducer 102 is arranged within a transducer aperture 134 (shown in FIG. 3) of ceramic header body 104, transducer aperture 134 divided into portions of first chamber 137 and second chamber 153. Ceramic header body 104 bounds aperture 134 and has sealably fixed thereon a first isolation diaphragm 136, which is located on first surface 138 of ceramic header body 104.

Figure 3:
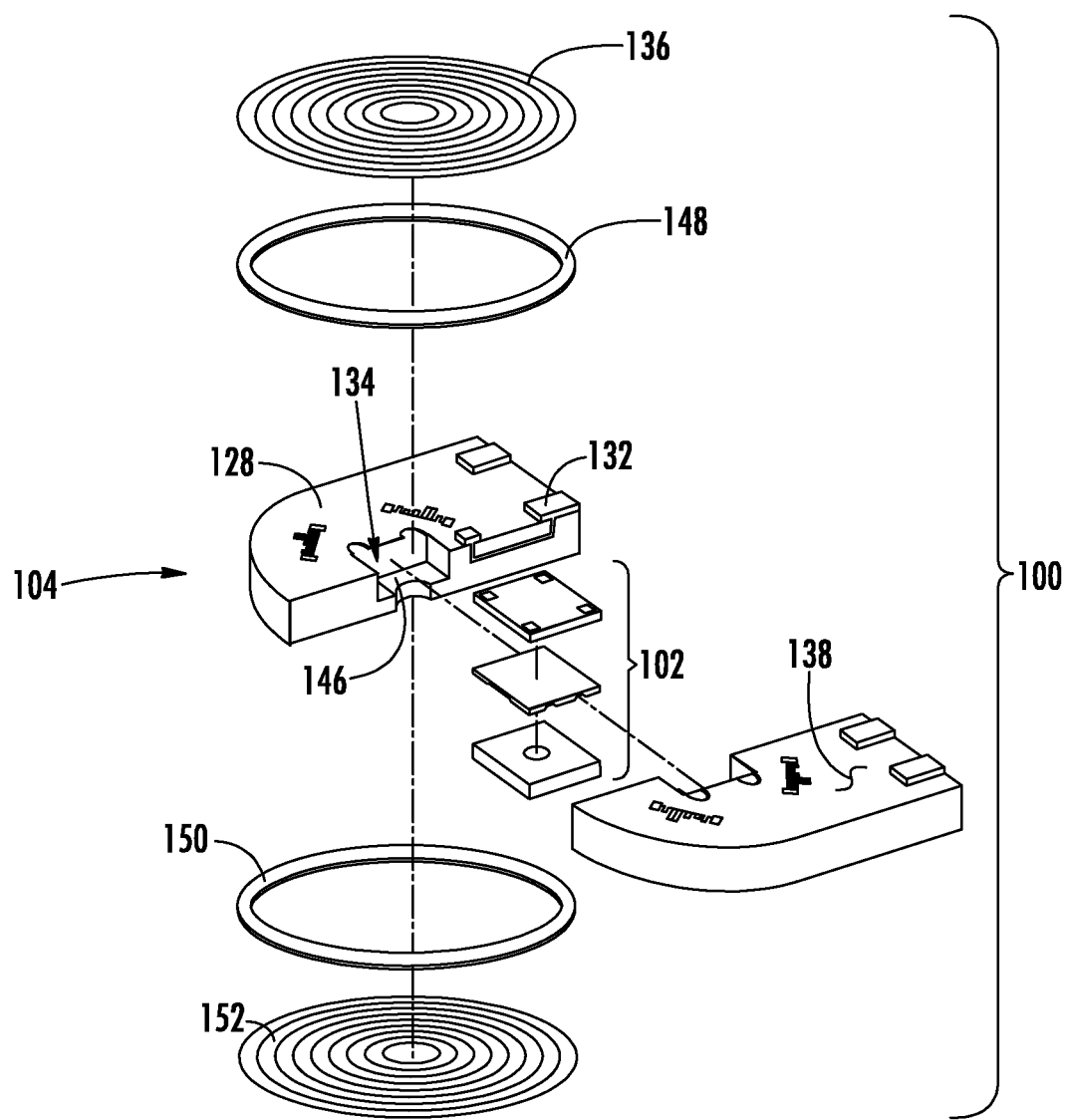
FIG. 3 is an exploded view of the pressure sensor of FIG. 1, showing the isolator diaphragms and MEMS pressure transducer exploded away from the ceramic header body.

In certain embodiments ceramic material 130 is a high temperature co-fired ceramic (HTCC) material. HTTC materials allow for hermetic packaging with electrical structures defined within the ceramic structure formed by the HTCC material, such electrical conductor 160/170 (shown in FIG. 5) an contact pads, e.g., exterior contact pad 132 located on the exterior of ceramic header body 104. As will be appreciated by those of skill in the art in view of the present disclosure, embedding electrical conductor 168/170 within ceramic header body 104 avoids the need provide pass-through apertures for electrical leads and the associated ceramic or glass sealing structures required to seal non-ceramic header structures in pressure sensors. With reference to FIG. 3, pressure sensor 100 is shown in an exploded view. Ceramic header body 104 defines transducer aperture 134. Transducer aperture 134 extends between first surface 138 and second surface 140 (shown in FIG. 4) and defines a pedestal seat 146 and a fluid displacement feature 142 (which is optional). Pedestal seat 146 is adapted to seat a pedestal 144. Pedestal 144 is configured and adapted to support MEMS pressure transducer 102 within transducer aperture 134. Fluid displacement feature 144 limits the amount of fluid 106/107 required to convey first pressure P1 (shown in FIG. 1) and second pressure P2 (shown in FIG. 1) to MEMS pressure transducer 102, which can improve the linearity of pressure sensor 100. It is contemplated that ceramic material 130 additionally have a coefficient of thermal expansion smaller than that of steel, reducing the effect that temperature has on MEMS pressure transducer 102 in comparison to sensors employing steel housings.

First surface 138 has a first metallization ring 148 extending about transducer aperture 134 which sealably fixes first isolation diaphragm 136 to ceramic header body 104. Second surface 140 (shown in FIG. 5) similarly has a second metallization ring 150 extending about transducer aperture 134 for sealably fixing a second isolation diaphragm 150 to ceramic header body 104 and on side thereof opposite first isolation diaphragm 136. Fixation of first isolation diaphragm 136 and second isolation diaphragm 152 with first metallization ring 148 and second isolation diaphragm 152 with second metallization ring 150 eliminates the need for weld rings and similar structures for attaching isolation diaphragms to ceramic header body 104. Although shown as separate structures exploded away from ceramic header body 102 in FIG. 3, it is to be understood and appreciated that first metallization ring 148 and second metallization ring 150 can be integrally formed on ceramic header body 102.

It is contemplated that pressure sensor 100 be configured and adapted for differential pressure sensing at high temperatures. In this respect pressure sensor 100 has operational temperature range 122 (shown in FIG. 1). Operational temperature range 122 can be, for example, from about −55° Celsius to about 225° Celsius. Temperatures in this range allow pressure sensor 100 to be employed in industrial process applications, such as gas turbines. In accordance with certain embodiments pressure sensor 100 can be miniaturized. In this respect pressure sensor 100 can have dimensioning 128 on the order of between about 10 millimeters and 17 millimeters in height and width. Dimensioning in this range can make pressure sensor 100 suitable for aerospace applications, such as on aircraft. It is also contemplated that pressure sensor 100 can have pressure tolerance 124 (shown in FIG. 1) suitable for high pressure applications. Pressure tolerance 124 can be, for example on the order of about 13.9 MPa and higher. Pressures in this range can allow pressure sensor 100 to serve as a drop-in replacement in applications employing pressure sensors with steel housings.

With reference to FIG. 4, pressure sensor 100 is shown in a plan view with first isolation diaphragm 136 (shown in FIG. 2) removed. As shown in FIG. 4 first surface 138 extends from the exterior of first metallization ring 148 to within first metallization ring 148, thereby forming a circuitry substrate surface portion 154. Because ceramic material 130 is an electrically resistive material, electrical conductor 168/170 and other conductive structures such as circuit elements can be formed directly on ceramic header body 104. For example, additional circuitry can also be placed on first surface 138 and or the opposite surface in locations overlayed by one of and spaced apart from both of first isolation diaphragm 136 and second isolation diaphragm 152 for post process modification, as appropriate for a given application. In the illustrated exemplary embodiment electrical conductor 168/170 includes a plurality of trim resistors 156 defined on circuitry substrate surface portion 154. Each trim resistor 156 is in turn connected electrically between a sensing element and an exterior contact pad 132 of electrical conductor 168/170. In this respect trim resistor 156 is connected in series between first sensing element 108 with a first wire bond 174 and to a first interior contact pad 158 by a second wire bond 176.

First interior contact pad 158 is electrically connected to exterior contact pad 132 electrical conductor 168/170. The electrical connection between interior contact pad 158 and exterior contact pad 132 is through one or more of a trace 168 (shown in FIG. 5), arranged within ceramic header body 104, and one or more via 170 (shown in FIG. 5), also arranged within ceramic header body 104. As will be appreciated by those of skill in the art in view of the present disclosure, placing trim resistors 156 within first metallization ring 148 on circuitry substrate surface portion 154 such that that they are spaced apart from first isolation diaphragm 136 allows for integration of the electronics associated with MEMS pressure transducer 102 within pressure sensor 100, limiting the need for external discrete electrical circuit elements. This places these electrical components, which can be comparatively fragile and sensitive, within the relatively well protected interior of MEMS pressure transducer 102. It also reduces (or eliminates entirely) the need for passivation for environmental protection, reducing the complexity and cost of MEMS pressure transducer 102. As will also be appreciated by those of skill in the art in view of the present disclosure, other circuitry structures, such as (a) direct-write resistors, (b) laser trim resistors, or (c) fusible resistors can also be formed on ceramic header body 104 and remain the scope of the present disclosure.

With reference to FIG. 5, pressure sensor 100 is shown in a cross-sectional view. Pressure sensor 100 includes MEMS pressure transducer 102 with pressure sensing diaphragm 113 (shown in FIG. 1) and sensor elements 108/110 (shown in FIG. 1). First isolation diaphragm 136 is spaced apart from pressure sensing diaphragm 113. MEMS pressure transducer 102 is supported within transducer aperture 134 by ceramic header body 104, first isolation diaphragm 136 coupled to MEMS pressure transducer 102 by fluid 106/107 (shown in FIG. 1). Ceramic header body 104 bounds fluid 106/107 and electrically connects MEMS pressure transducer 102 with external environment 10 through electrical conductor 168/170, e.g., trace 168 and via 170, defined within ceramic header body 104.

It is contemplated that electrical conductor 168/170 include one or more contact pad, e.g., an interior contact pad 158 and/or an exterior contact pad 132. Interior contact pad 158 is located between first isolation diaphragm 136 and second isolation diaphragm 152. Exterior contact pad 132 is arranged outside of transducer aperture 134 and on first surface 138. Via 170 is located within ceramic header body 104, is insulated by the ceramic material 130 forming ceramic header body 104, and is connected to exterior contact pad 132. Via 170 is in turn electrically connected by trace 168 to interior contact pad 158, exterior contact pad 132 connected to MEMS pressure transducer 102 through via 170 and trace 168. As will be appreciated by those of skill in the art in view of skill in the art, forming trace 168 and via 170 within the interior of ceramic header body 104 avoids the need for a separate electrically insulator and pass through, which would otherwise be required were ceramic header body 104 formed from an electrically conductive material.

Figure 6:
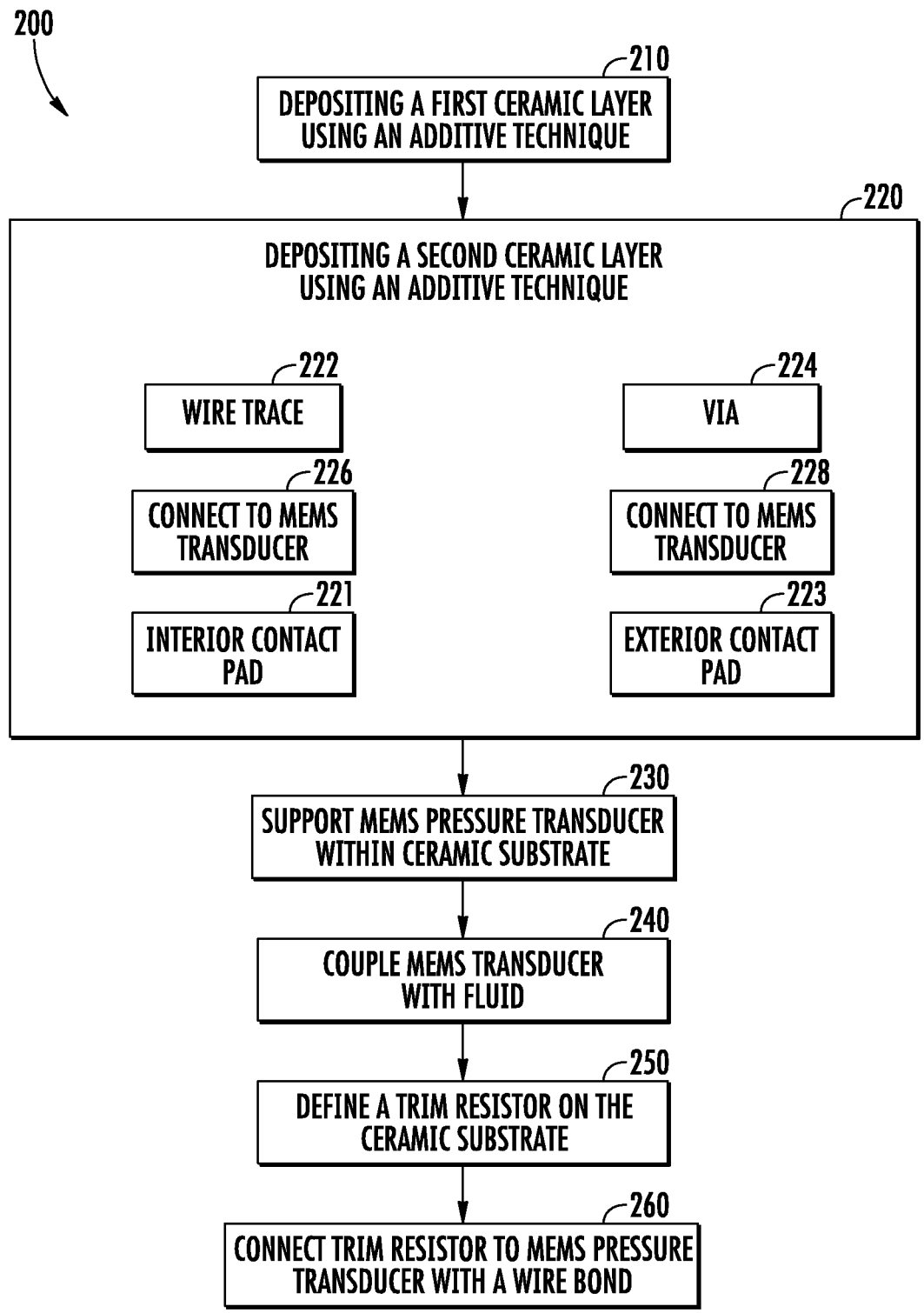
FIG. 6 is a block diagram of a method of making a pressure sensor, showing operations for making the pressure sensor.

With reference to FIG. 6, a method 200 of making a pressure sensor, e.g., pressure sensor 100 (shown in FIG. 1), is shown. Method 200 includes depositing a first ceramic layer, e.g., first ceramic layer 162 (shown in FIG. 2), using an additive manufacturing technique, as shown with box 210. A second ceramic layer, e.g., second ceramic layer 164 (shown in FIG. 2), is deposited on the first ceramic layer using the additive manufacturing technique such that the first and second ceramic layers define a transducer aperture, e.g., transducer aperture 134 (shown in FIG. 1), as shown with box 220. A MEMS pressure transducer, e.g., MEMS pressure transducer 102 (shown in FIG. 1), is supported within the transducer aperture, as shown with box 230. A first isolator diaphragm, e.g., first isolation diaphragm 136 (shown in FIG. 2), is spaced apart from the pressure sensing diaphragm of the sensor and is coupled to the pressure sensing diaphragm with a low-CTE fluid, e.g., fluid 106/107 (shown in FIG. 1), as shown with box 240.

In certain embodiments depositing the second ceramic layer can include defining a trace, e.g., trace 168 (shown in FIG. 5), within the second ceramic layer, as shown with box 222. The MEMS pressure transducer can be electrically connected to the trace, as shown with box 226. Depositing the second ceramic layer can include defining a via, e.g., via 170, within the second ceramic layer, as shown with box 224. The via can be electrically connected to the MEMS sensor, as shown with box 228. An interior contact pad, e.g., interior contact pad 158 (shown in FIG. 3), can be defined on the ceramic header body and electrically connected to an exterior contact pad, e.g., exterior contact pad 132 (shown in FIG. 2), as shown with box 221 and 223. A trim resistor, e.g., trim resistor 156 (shown in FIG. 4), can be defined on the surface of the ceramic header body, as shown with box 250. Wire bonds, e.g., first wire bond 174 (shown in FIG. 4) and second wire bond 176 (shown in FIG. 4), can connect the trim resistor in series between the MEMS pressure transducer and the interior contact pad, as shown with box 260.

The methods and systems of the present disclosure, as described above and shown in the drawings, provide for pressure sensors with superior properties including relatively small size and co-packaged MEMS pressure transducer circuitry. Further, the methods and systems of the present disclosure enable batch processing of sensors, reducing costs by allowing production of sensors in volume. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A pressure sensor, comprising:
   a MEMS pressure transducer with a pressure sensing diaphragm and sensor elements;
   an isolator diaphragm spaced apart from the pressure sensing diaphragm; and
   a ceramic header body having an electrical conductor and a transducer aperture with the MEMS pressure transducer supported therein, wherein the isolator diaphragm is sealably fixed to the ceramic body and coupled to the MEMS pressure transducer by a fluid disposed within the aperture, the ceramic header body bounds the fluid, and the electrical conductor insulated by the ceramic header body to electrically connect the MEMS pressure transducer with the external environment,
   the header divided into a first chamber and a second chamber, wherein the isolator diaphragm is a first isolator diaphragm and further comprising a second isolator diaphragm, the second isolator diaphragm seated on the ceramic header body on a side of the MEMS pressure transducer opposite the first isolator diaphragm, the electrical conductor including:
      an exterior contact pad on the header exterior,
      a via electrically connected to the exterior contact pad,
      a trace electrically connected to the via,
      an interior contact pad arranged within the transducer aperture, and
      a trim resistor electrically connected to the interior contact pad and spaced apart from the first isolator diaphragm;
   a first wire bond connecting the trim resistor to the MEMS pressure transducer;
   a second wire bond connecting the interior contact pad to the trim resistor; and
   a low coefficient of thermal expansion fluid disposed within the transducer aperture, wherein the sensor is seated directly against a pedestal seat and side walls of an aperture of the ceramic header body, the same ceramic header body that insulates the electrical conductor.

2. The pressure sensor as recited in claim 1, wherein the ceramic header body is formed from a high temperature co-fired ceramic material.

3. The pressure sensor as recited in claim 1, wherein the electrical conductor includes a trace electrically connected to the MEMS pressure transducer and located within the ceramic header body.

4. The pressure sensor as recited in claim 1, wherein the electrical conductor includes a via electrically connected to the MEMS pressure transducer and located within the ceramic header body.

5. The pressure sensor as recited in claim 1, wherein the electrical conductor includes an interior contact pad arranged within the transducer aperture.

6. The pressure sensor as recited in claim 5, further comprising a wire bond connecting the interior contact pad to the MEMS pressure transducer.

7. The pressure sensor as recited in claim 5, wherein the electrical conductor includes an exterior contact pad on the header exterior and electrically connected to the interior contact pad.

8. The pressure sensor as recited in claim 1, wherein the electrical conductor includes a trim resistor electrically connected to the MEMS pressure transducer and spaced apart from the isolator diaphragm.

9. The pressure sensor as recited in claim 1, wherein the ceramic header body includes a metallization ring extending about the transducer aperture, the isolation diaphragm fixed to the metallization ring.

10. The pressure sensor as recited in claim 9, wherein the metallization ring is a first metallization and the isolation diaphragm is a first isolation diaphragm, and further comprising:
   a second metallization ring extending about the transducer aperture and arranged on a side of the ceramic header body opposite the first metallization ring; and
   a second isolation diaphragm fixed to the ceramic header body by the second metallization ring.

11. The pressure sensor as recited in claim 1, wherein the ceramic header body includes a pedestal shelf bounding the transducer aperture, and further comprising a pedestal seated on the pedestal shelf and bounding the fluid.

12. The pressure sensor as recited in claim 1, wherein the isolator diaphragm is a first isolator diaphragm and further comprising a second isolator diaphragm, the second isolator diaphragm seated on the ceramic header body opposite the first isolator diaphragm.

13. The pressure sensor as recited in 1, wherein the fluid comprises a low coefficient of thermal expansion fluid.

14. The pressure sensor as recited in claim 1, wherein ceramic header body includes a fluid displacement member bounding the fluid to limit volume of the fluid for linearizing response of the MEMS pressure transducer.

15. The pressure sensor as recited claim 1, wherein the header includes no penetrations for electrical leads.

16. A differential pressure sensor, comprising:
a pressure sensor, the pressure sensor comprising:
a MEMS pressure transducer with a pressure sensing diaphragm and sensor elements;
an isolator diaphragm spaced apart from the pressure sensing diaphragm; and
a ceramic header body having an electrical conductor and a transducer aperture with the MEMS pressure transducer supported therein, wherein the isolator diaphragm is sealably fixed to the ceramic body and coupled to the MEMS pressure transducer by a fluid disposed within the aperture, the ceramic header body bounds the fluid, and the electrical conductor insulated by the ceramic header body to electrically connect the MEMS pressure transducer with the external environment, the header divided into a first chamber and a second chamber, wherein the isolator diaphragm is a first isolator diaphragm and further comprising a second isolator diaphragm, the second isolator diaphragm seated on the ceramic header body on a side of the MEMS pressure transducer opposite the first isolator diaphragm, the electrical conductor including:
an exterior contact pad on the header exterior,
a via electrically connected to the exterior contact pad,
a trace electrically connected to the via,
an interior contact pad arranged within the transducer aperture, and
a trim resistor electrically connected to the interior contact pad and spaced apart from the first isolator diaphragm;
a first wire bond connecting the trim resistor to the MEMS pressure transducer;
a second wire bond connecting the interior contact pad to the trim resistor; and
a low coefficient of thermal expansion fluid disposed within the transducer aperture.

17. A method of making a pressure sensor, comprising:
depositing a first ceramic layer;
depositing at least one second ceramic layer on the first ceramic layer, the first ceramic layer and the at least one second ceramic layers defining a transducer aperture, wherein depositing at least one of the first ceramic layer and the second ceramic layer includes depositing an electrical conductor with the at least one of the first ceramic layer and the second ceramic layer forming a ceramic header;
co-firing the first ceramic layer and the at least one second ceramic layer using a high temperature co-fired ceramic technique;
supporting a MEMS pressure transducer having a pressure sensing diaphragm with sensor elements in the transducer aperture within the transducer aperture;
spacing an isolator diaphragm apart from the pressure sensing diaphragm; and
coupling the isolator diaphragm with the pressure sensing diaphragm with a fluid,
wherein the ceramic header is divided into a first chamber and a second chamber, wherein the isolator diaphragm is a first isolator diaphragm and further comprising a second isolator diaphragm, the second isolator diaphragm seated on the ceramic header body on a side of the MEMS pressure transducer opposite the first isolator diaphragm, the electrical conductor including:
an exterior contact pad on the header exterior,
a via electrically connected to the exterior contact pad,
a trace electrically connected to the via,
an interior contact pad arranged within the transducer aperture, and
a trim resistor electrically connected to the interior contact pad and spaced apart from the first isolator diaphragm;
a first wire bond connecting the trim resistor to the MEMS pressure transducer;
a second wire bond connecting the interior contact pad to the trim resistor; and
a low coefficient of thermal expansion fluid disposed within the transducer aperture, wherein the sensor is seated directly against a pedestal seat and side walls of an aperture of the ceramic header body, the same ceramic header body that insulates the electrical conductor.

18. The method as recited in claim 17, wherein depositing the first ceramic layer and the at least one second ceramic layer includes defining an electrical conductor including a via in the first ceramic layer and the at least one second ceramic layer, and further comprising electrically connecting the MEMS pressure transducer to the via.

19. The method as recited in claim 17, wherein depositing the first ceramic layer and the at least one second ceramic layer includes defining an electrical conductor including a trace within the first ceramic layer and the at least one second ceramic layer, the method further comprising electrically connecting the MEMS pressure transducer to the trace.

20. The method as recited in claim 17, further comprising:
defining an interior contact pad in communication within the transducer aperture;
defining an exterior contact pad on the second ceramic layer;
wherein defining the electrical conductor includes defining a trim resistor on one of the first ceramic layer and the at least one second ceramic layer; and
connecting the exterior contact pad to the interior contact pad using the trim resistor.

* * * * *